(12) United States Patent
Kaku et al.

(10) Patent No.: US 8,161,051 B2
(45) Date of Patent: Apr. 17, 2012

(54) METHOD AND APPARATUS FOR DATA PROCESSING WITH INDEX SEARCH

(75) Inventors: Kenichi Kaku, Sagamihara (JP); Norihiro Hara, Kawasaki (JP); Kohji Kimura, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 639 days.

(21) Appl. No.: 12/352,185

(22) Filed: Jan. 12, 2009

(65) Prior Publication Data
US 2009/0187545 A1    Jul. 23, 2009

(30) Foreign Application Priority Data

Jan. 21, 2008 (JP) ................................. 2008-010370

(51) Int. Cl.
G06F 17/30 (2006.01)
(52) U.S. Cl. ........................ 707/741; 707/793; 707/796
(58) Field of Classification Search .................. 707/741, 707/742, 793–796
See application file for complete search history.

(56) References Cited

U.S. PATENT DOCUMENTS

| 6,047,291 | A  | * | 4/2000 | Anderson et al. | ............. 707/792 |
| 6,338,056 | B1 | * | 1/2002 | Dessloch et al. | ............. 707/711 |
| 6,519,597 | B1 | * | 2/2003 | Cheng et al. | ............. 707/999.01 |
| 7,996,387 | B2 | * | 8/2011 | Das et al. | ....................... 707/715 |

FOREIGN PATENT DOCUMENTS

JP    2007-299021    11/2007

OTHER PUBLICATIONS

Jim Gray, "Transaction Processing: Concepts and Techniques", 1993.

* cited by examiner

*Primary Examiner* — Khanh Pham
(74) *Attorney, Agent, or Firm* — Mattingly & Malur, PC

(57) ABSTRACT

In a database management apparatus for managing a database where an index is used in a search for data, the data is stored in a table that has attributes of the data as columns. The index is created in association with at least one column. The columns include an index key column for which the index is created without data being stored. Upon reception of a request to register the data in the table including the index key column, the data in columns other than the index key column is registered. An index of the index key column is updated using data corresponding to the index key column.

3 Claims, 12 Drawing Sheets

310 TABLE DEFINITION INFORMATION (COLUMN INFORMATION)

| TABLE NAME 311 | COLUMN NAME 312 | COLUMN DATA TYPE 313 | INDEX KEY COLUMN LABEL 314 |
|---|---|---|---|
| INSHOKU2 | SID | INT | NULL |
| INSHOKU2 | TEL_NO | PACK(12,10) | NULL |
| INSHOKU2 | SHOP_CODE | INT | NULL |
| INSHOKU2 | AREA_CODE | INT | NULL |
| INSHOKU2 | ALL_KANA_NAME | VARCHAR(4000) | "T"  ~315 |
| . | . | . | . |

FIG. 3

TABLE DEFINITION REQUEST

```
CREATE TABLE "INSHOKU2" (
  "SID" INT,
  "TEL_NO" PACK(12,10),
  "SHOP_CODE" INT,
  "AREA_CODE" INT,
  "ALL_KANA_NAME" VARCHAR(4000) TEXTSEARCH INDEX KEY)
```

FIG. 4

320 INDEX DEFINITION INFORMATION

| INDEX NAME | TABLE NAME | COLUMN NAME | INDEX TYPE |
|---|---|---|---|
| IDX_SID | INSHOKU2 | SID | B-TREE |
| IDX_ALLKANA | INSHOKU2 | ALL_KANA_NAME | TEXTSEARCH |
| . | . | . | . |
| . | . | . | . |
| . | . | . | . |

*FIG. 5*

INDEX DEFINITION REQUEST

```
CREATE INDEX "IDX_ALLKANA"
  ON "INSHOKU2"("ALL_KANA_NAME")
    TEXTSEARCH
```

*FIG. 6*

METHOD AND APPARATUS FOR DATA PROCESSING WITH INDEX SEARCH

CLAIM OF PRIORITY

The present application claims priority from Japanese application JP 2008-10370 filed on Jan. 21, 2008, the content of which is hereby incorporated by reference into this application.

BACKGROUND OF THE INVENTION

This invention relates to a technology of managing a database that can be searched with the use of an index.

The amount of information handled by embedded devices, as exemplified by vehicle navigation systems and cellular phones, is increasing on a daily basis. End-users of embedded devices wish to use the ever increasing information at any time without experiencing inconveniences. On the other hand, from the standpoint of the usability of embedded devices, end-users prefer the overall sizes of embedded devices to be as small as possible.

It is extremely difficult to keep fulfilling end-users' demands if manufacturers develop embedded devices by developing data processing modules from scratch on their own. For that reason, as many enterprise systems implement data processing with the use of a database management system (DBMS), embedded devices, too, are beginning to utilize DBMS as a data management platform in order to assume data manipulation functions easily and quickly.

In order to facilitate the securing of more programmers for the development of an application program that is run on an embedded device to provide various functions to end-users, it is desirable to employ a data model that is in the two-dimensional table format and data manipulation requests that are in SQL. In the two-dimensional table format, one piece of data contains a plurality of data fields (attributes) which constitute "columns", and constitutes a "row". A plurality of "rows" together constitute a "table". The query language that is used to manipulate data held in the "table" is SQL.

From the standpoint of the usability of embedded devices, specifically the ease of handling (compactness), the major two requirements that a DBMS used in an embedded device is expected to meet are as follows.

1. Implementing data manipulation functions including the data search function quickly while keeping the footprint small (i.e., keeping the CPU utilization ratio low).

2. Storing as large an amount of data as possible in a storage area that is installed in the embedded device.

Embedded devices are also required to provide end-users with data manipulation services for manipulating data from a diversity of perspectives. For example, many of recent vehicle navigation systems instruct end-users to specify a destination by inputting keywords from a plurality of aspects such as the address, the phone number, the name of the institution, and the type (genre) of the institution in order to search for the destination.

Various technologies have been disclosed as efficient ways to conduct a full-text search for specified keywords on a database. For example, JP 2007-299021 A discloses a full-text search technology that keeps an index for full-text search separately from the body of input and stored data. This full-text search technology includes a technology in which, upon reception of a search request, the index for full-text search is used to quickly identify data that meets a criterion of a keyword specified by an end-user. The data body here is implemented as a row in the table format data model described above. For database construction technology including a concrete data structure that implements a row, see, for instance, Jim Gray and Andreas Reuter, "Transaction Processing: Concepts and Techniques", Morgan Kaufmann Publishers, 1993, p. 772-784.

SUMMARY OF THE INVENTION

As mentioned above, a database management system (DBMS) that is applied to embedded devices such as vehicle navigation systems is required to reduce the data capacity so that data can be searched quickly. An end-user inputs a keyword of his/her interest to conduct a keyword search for information (for example, "institution") related to the keyword. In most databases, related information is stored and managed while scattered among a plurality of tables and this makes the data capacity small, but columns to be searched for (e.g., address and name of institution) are stored separately in a plurality of tables.

When each table is assigned a category, one practicable way to conduct a search across categories (federated search) is to gather search target data to one column and define a full-text search index to this column. A drawback of this method is that duplicate data held in the search target column increases the database capacity. While large-capacity memories have lately become available at low cost, the rapid increase in amount of necessary data continues and the problem with data storage capacity still remains important. If a memory capacity necessary to store data is somehow reduced, the freed up memory area can be put into use to store new data.

This invention has been made in view of the above, and it is therefore an object of this invention to provide a technology of reducing a database capacity that is used to save or store table data.

The representative aspects of this invention are as follows. That is, there is a database management method for a database management apparatus which includes a processor and a memory to manage a database where an index is used in a search for data, the data being stored in a table that has attributes of the data as columns, the index being created in association with at least one column, the columns including an index key column for which the index is created without the data being stored, the database management method including the steps of: registering, upon reception of a request to register the data in the table including the index key column, the data in columns other than the index key column; and updating an index of the index key column using data corresponding to the index key column.

According to the aspect of this invention, the database capacity that is used to save or store table data can be reduced.

BRIEF DESCRIPTION OF THE DRAWINGS

The present invention can be appreciated by the description which follows in conjunction with the following figures, wherein:

FIG. 3 is a diagram illustrating an example of table definition information (column information) according to the embodiment of this invention;

FIG. 4 is a diagram illustrating an example of a table definition request (SQL) for creating table definition information according to the embodiment of this invention;

FIG. 5 is a diagram illustrating an example of index definition information according to the embodiment of this invention;

FIG. 6 is a diagram illustrating an example of an index definition request (SQL) for creating an index according to the embodiment of this invention;

DETAILED DESCRIPTION OF THE PREFERRED EMBODIMENT

A detailed description of an embodiment of this invention will be given below with reference to the drawings.

Figure 1:
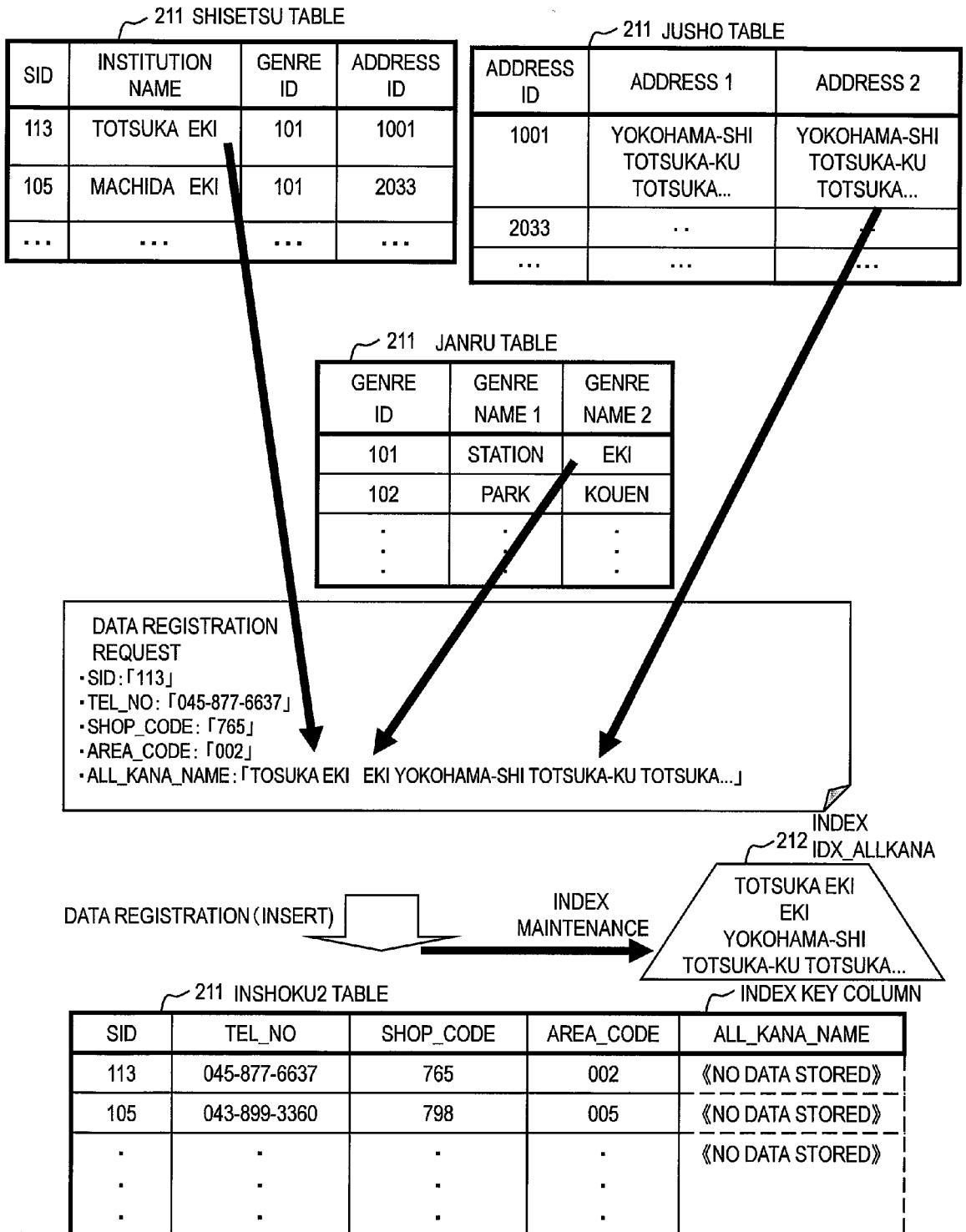
FIG. 1 is a diagram outlining the overall view according to an embodiment of this invention.

FIG. 1 is a diagram outlining the overall view of this embodiment.

In a database management method that is employed by a database management apparatus of this embodiment, each piece of data constitutes a row in the table format and fields (attributes) contained in the data are stored as columns in the manner described above. A column associated with data on which a keyword search is conducted is defined here as an "index key column". Column data (also referred to as values) of a column defined as an index key column is not stored as table data in a database, and is held in an index defined to the index key column.

FIG. 1 illustrates how table data is stored (saved) in an INSHOKU2 table (211) in which an ALL_KANA_NAME column is defined as an index key column ("inshoku" is a Japanese word meaning "drinking and eating"). An SID column, a TEL_NO column, a SHOP_CODE column, and an AREA_CODE column are not defined as an index key column, and store column data, which constitutes row data. For example, the first row of the INSHOKU2 table holds data (also referred to as values) "113", "045-877-6637", "765", and "002".

On the other hand, the ALL_KANA_NAME column defined as an index key column does not hold data "TOTSUKA EKI, EKI, YOKOHAMA-SHI TOTSUKA-KU TOTSUKA" as column data. The column data is held only in an index IDX_ALLKANA (212). The data "TOTSUKA EKI, EKI, YOKOHAMA-SHI TOTSUKA-KU TOTSUKA" is generated by an application program as data of the ALL_KANA_NAME column in the INSHOKU2 table, which is part of registration data to be registered in the INSHOKU2 table, from column data of an institution name (pronunciation of institution name) column in a SHISETSU table, column data of a genre name 1 column and genre name 2 (pronunciation of genre name) column in a JANRU table, and column data of an address 1 column and an address 2 (pronunciation of address 1) column in a JUSHO table ("shisetsu" is a Japanese word meaning "institution", "janru" means "genre", "jusho" is a Japanese word meaning "address").

What information is to be contained in the ALL_KANA_NAME column is determined by the needs of the users of this database management apparatus. "Pronunciation" here is how ideographic characters such as kanji (Chinese ideograms) are pronounced. The way to pronounce the ideographic characters is expressed in the Roman alphabet. Hence, Yokohama city is expressed as "YOKOHAMA-SHI".

A case in which an end-user conducts a search with "YOKOHAMA-SHI" as a keyword across all search items (institution name, genre name 1, genre name 2, address 1, and address 2) will be described. In this case, an application program that provides a search service sends to a database management system a search request using the following SQL statement.

SELECT "SID" FROM "INSHOKU2" WHERE CONTAINS ("ALL_KANA_NAME", "YOKOHAMA-SHI")

This SQL statement is specifically a search request that requests to "retrieve the SID (institution ID) of data that contains "YOKOHAMA-SHI"".

Receiving the search request, the database management system accesses the index 212 to identify row data that meets the search criterion (i.e., to contain "YOKOHAMA-SHI"), accesses the identified row data, and returns data of the SID column which is the requested data as a search result to the application program which has made the request. The application program which has received the search result processes the data returned as a search result and presents the service execution result to the end-user.

In this way, column data of a column that is searched in a keyword-specified search is not stored as table data, and hence the database capacity is minimized compared to prior art where column data is stored. In addition, the embodiment of this invention accomplishes a federated search by a search request to an index key column of a single table, unlike prior art where information is stored scattered among a plurality of tables and thus an application program needs to request a search of the plurality of tables separately to merge search results. The development of an application program is thus reduced in man-hours and the performance is improved as a result.

Figure 2:
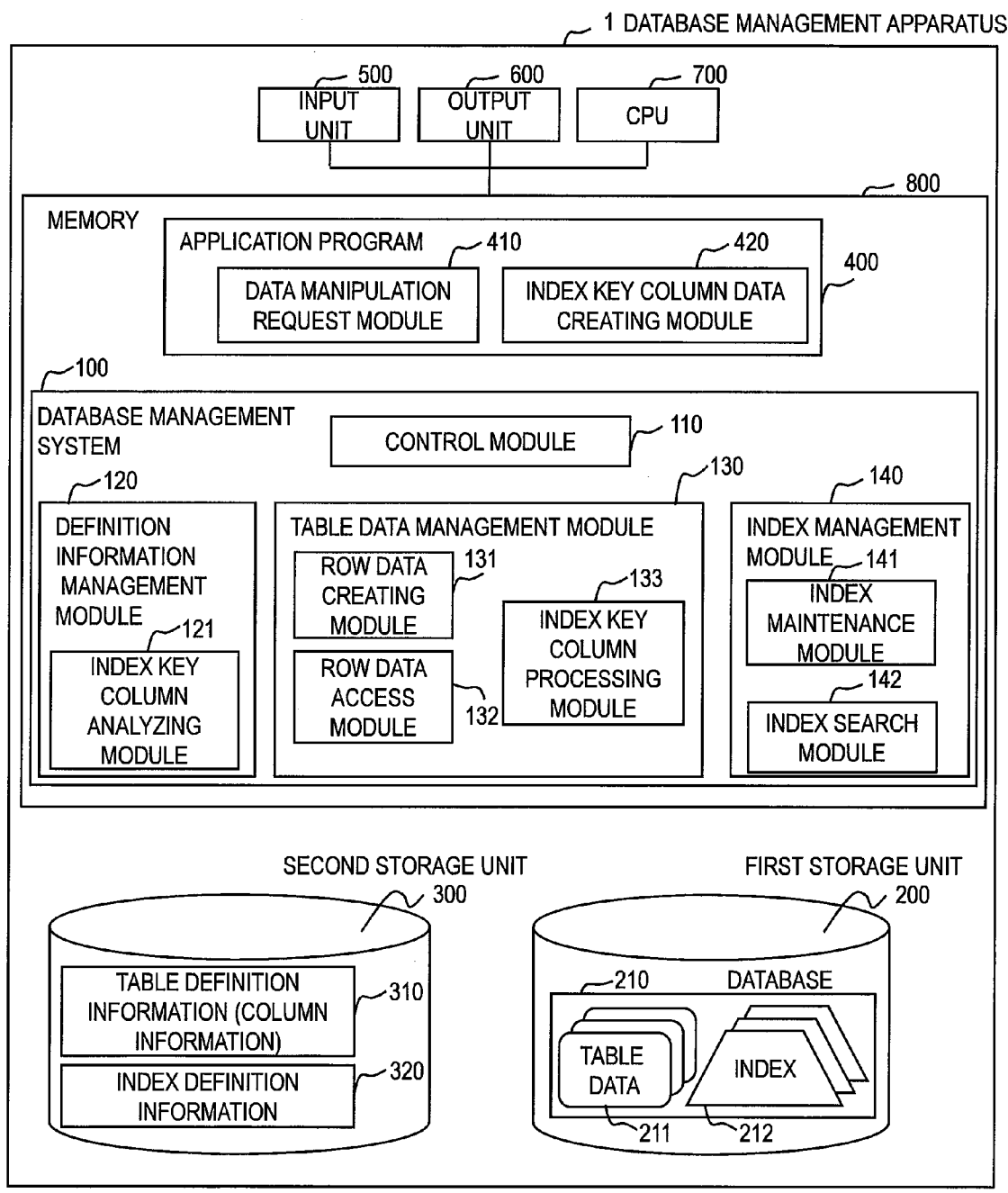
FIG. 2 is a block diagram illustrating an example of the configuration of a database management apparatus according to the embodiment of this invention.

FIG. 2 is a block diagram illustrating an example of the configuration of the database management apparatus according to the embodiment of this invention.

A database management apparatus 1 includes an input unit 500, an output unit 600, a central processing unit (CPU) 700, a memory 800, a first storage unit 200, and a second storage unit 300. The input unit 500, the output unit 600, the CPU 700, the memory 800, the first storage unit 200, and the second storage unit 300 are coupled to one another by an internal bus.

The input unit 500 receives processing requests from the outside. The output unit 600 displays an output result of an application program 400. An output result of the application program 400 is, for example, information processed by a database management system 100 and further processed by the application program 400. The output unit 600 is, for example, a liquid crystal display.

The CPU 700 executes programs stored in the memory 800. The memory 800 stores programs executed by the CPU 700 and data necessary for processing. The programs stored in the memory 800 are, specifically, the application program 400 and the database management system 100.

The application program 400 is run by the CPU 700 to execute given business operation processing. The application program 400 includes a data manipulation request module 410 and an index key column data creating module 420.

The data manipulation request module 410 has a function of requesting the database management system 100, which will be described later, to manipulate data stored in a database (data manipulation includes data search (also referred to as data reference or data read), data insertion (also referred to as data registration), data deletion, and data update). Data insertion or data update may be referred to as data registration.

The index key column data creating module 420 has a function of creating registration data or updated data for an index key column when the data manipulation request is a data registration request or a data update request.

Registration data or updated data for an index key column is created by, for example, specifying attributes of data to be registered and coupling values (or data) that are related to the specified attributes. To give a specific example, when information about an institution is to be registered as illustrated in FIG. 1, the name, genre, address and other attributes of the institution are specified and the pronunciations of these attributes are coupled together.

The database management system 100 has a function of managing a database 210, which contains the table data 211 and the index 212. The table data 211 is a group of data expressed conceptually in a table format, and the index 212 is a measure to access the table data 211 efficiently. The database management system 100 includes a control module 110, a definition information management module 120, a table data management module 130, and an index management module 140.

The control module 110 performs the overall control of the database management system 100. Specifically, the control module 110 controls the definition information management module 120 according to a table definition and an index definition that are requested from the application program 400 or other programs.

When a data manipulation request is received from the data manipulation request module 410 of the application program 400, the control module 110 performs the requested data manipulation on the table data 211 using the index 212 if necessary. To give a more detailed description, the control module 110 first analyzes a data manipulation request (data registration request, data deletion request, data update request, or data search request) input from the data manipulation request module 410 of the application program 400. The control module 110 next creates an execution procedure suitable for the manipulation (access) to be executed in the database 210 (the procedure determines, for example, which index is to be used), and requests the table data management module 130 to manipulate data following the execution procedure.

The control module 110 also has a function of returning execution result data which is the result of manipulation executed in the database 210 to the application program 400 which is the sender of a data manipulation request.

The definition information management module 120 manages various definition information including logical schema components that constitute the database 210, such as the table data 211 and the index 212, and table information. Specifically, the definition information management module 120 creates and stores table definition information 310 as definition information of the table data 211 and index definition information 320 as definition information of the index 212. When a data manipulation request is issued, the definition information management module 120 provides the stored definition information that is requested by the table data management module 130 or the index management module 140. The definition information management module 120 receives a table definition request and an index definition request from the control module 110, analyzes the received requests, and stores results of the analysis in the second storage unit 300 as the table definition information (column information) 310 and the index definition information 320.

The definition information management module 120 includes an index key column analyzing module 121. The index key column analyzing module 121 executes analyzing processing when a table definition request or an index definition request involves an index key column.

The table data management module 130 manages the table data 211 of the database 210 which is stored in the first storage unit 200. Specifically, the table data management module 130 executes data registration, deletion, update, and search of the table data 211 as data manipulation.

The table data management module 130 includes a row data creating module 131, a row data access module 132, and an index key column processing module 133.

The row data creating module 131 has a function of creating row data to be stored in the database 210 when data registration or update is to be performed on the table data 211 as data manipulation. In the case where column data for creating row data corresponds to an index key column, the index key column processing module 133 processes this column data. Specifically, in the case of column data corresponding to an index key column, information indicating that the column data corresponds to an index key column is stored in an area associated with the column data, instead of storing the actual data.

The row data access module 132 has a function of executing data registration, deletion, update, and search in the table data 211 as data manipulation. The table data 211 contains a column that serves as an index key column. Data of the index key column is accessed and processed by the index key column processing module 133.

The index key column processing module 133 has a function of accessing data of an index key column.

The index management module 140 manages the index 212 of the database 210 which is stored in the first storage unit 200. The index management module 140 includes an index maintenance module 141 and an index search module 142.

The index maintenance module 141 has a function of updating data that implements an index and changing the structure of an index based on an index maintenance request sent from the table data management module 130.

The index search module 142 has a function of searching an index for column data that matches a search criterion (keyword search) based on an index search request sent from the table data management module 130 and obtaining the row identifier of a row that holds this column data as a search result.

The first storage unit 200 stores, as the database 210, the table data 211 and the index 212 for improving the efficiency of searching the table data 211. The first storage unit 200 is storage such as a flash memory or a magnetic disk.

Specifically, the first storage unit 200 stores the table data 211 created by the data manipulation request module 410 of the application program 400. The first storage unit 200 also stores the index 212 created in the index management module 140 of the database management system 100. The processing modules installed in the memory 800 of this embodiment are implemented by programs, but may be implemented by objects or hardware instead. The processing modules installed in the memory 800 of this embodiment are stored on a storage medium such as a CD-ROM or a DVD-ROM, and installed in the memory 800 by an installer that the OS or the database system has.

Figure 7:
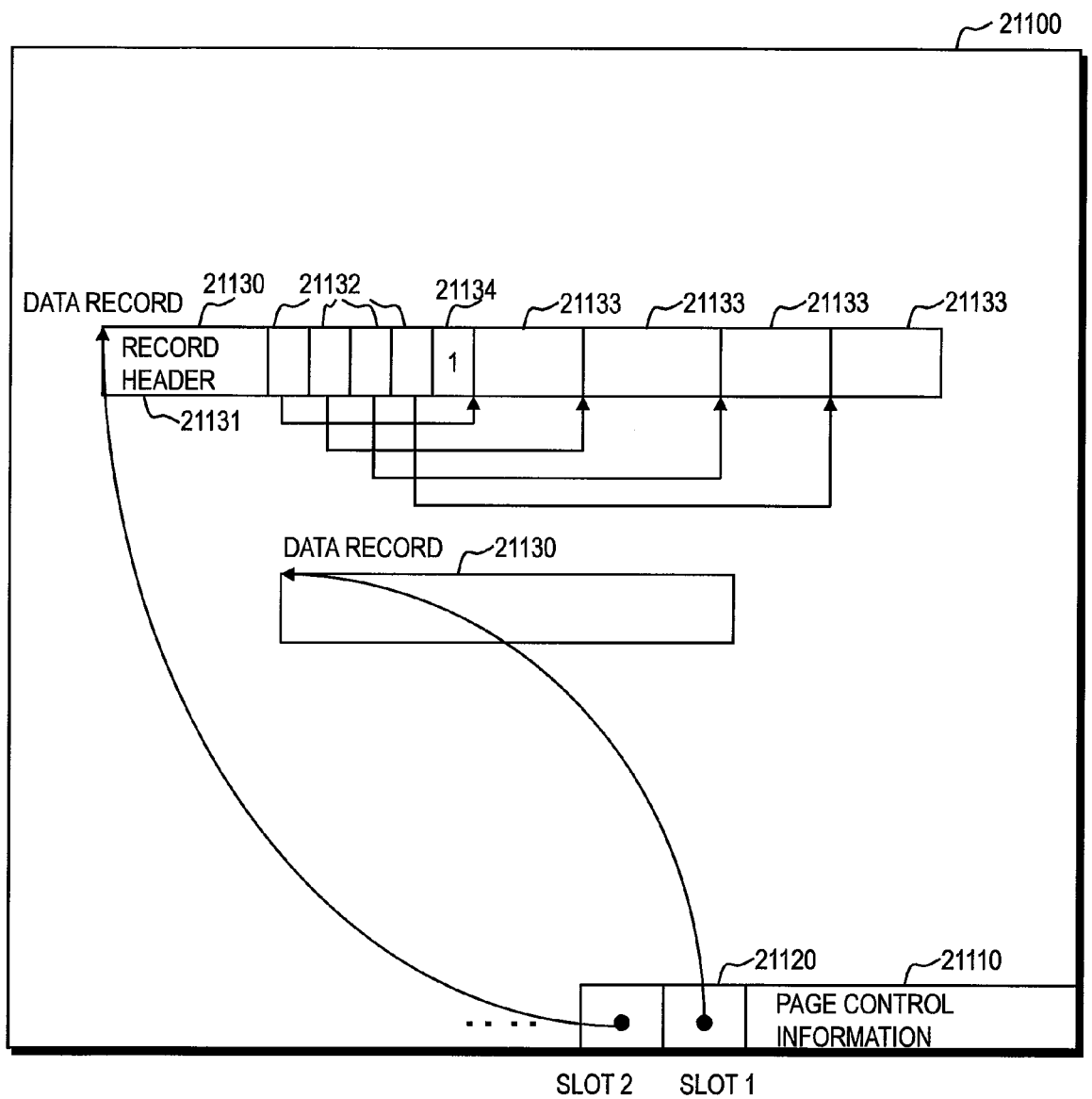
FIG. 7 is a diagram illustrating an example of a row data storing structure of a table containing an index key column which is managed by a table data management module according to the embodiment of this invention.

FIG. 7 is a diagram illustrating an example of a row data storing (saving) structure of a table containing an index key column which is managed by the table data management module 130 of this embodiment.

Row data is stored in the form of a data record 21130 illustrated in FIG. 7. The data record 21130 is stored within a page 21100, which is the unit of storage area access or the unit of input/output (in the case where the storage area is provided by a disk device or the like).

The page 21100 is the physical constitutional unit of the database 210. A plurality of data records 21130 can be stored within a single page 21100. A position where in the page 21100 the data record 21130 is stored is identified by a slot 21120. A position counted from the top of the page 21100 where the data record 21130 is stored is set in an area of the slot 21120. Page control information 21110 is slot allocation information and other information for area management such as slot management and management of the utilization state of areas within the page.

The data record 21130 contains data fields 21132, 21133, and 21134. The data field 21134 stores information about an index key column. The data fields 21132 and 21133 store information about columns that are not an index key column.

The table data management module 130 (row data creating module 131 and index key column processing module 133) stores data in the data record 21130. The row data creating module 131 stores column data itself in the data field 21133. In the data field 21132, the row data creating module 131 stores information indicating the head storing position of the data field 21133 where the column data is stored.

The index key column processing module 133 does not store column data corresponding to an index key column itself in the data record 21130, as illustrated in the structure of the data record 21130 of FIG. 7. Instead, the index key column processing module 133 stores a value indicating that the column data corresponds to an index key column ("1" in this example) in the data field 21134 that is associated with the data field 21132 where the column data storing position is stored.

To store a "NULL value" as column data, "0" is stored in the data field 21132 or the data field 21134 as information indicating a NULL value. When column data is a "NULL value", no area is secured for the data field 21133 for column data of the column in question. An offset value from the head of the data record 21130 to a column data storing position is employed as a value indicating the column data storing position. The area length of a record header 21131 for managing the length of the data record 21130 and the like is 16 bytes here. The value "1" can therefore function as a value indicating that the column data corresponds to an index key column.

Figure 8:
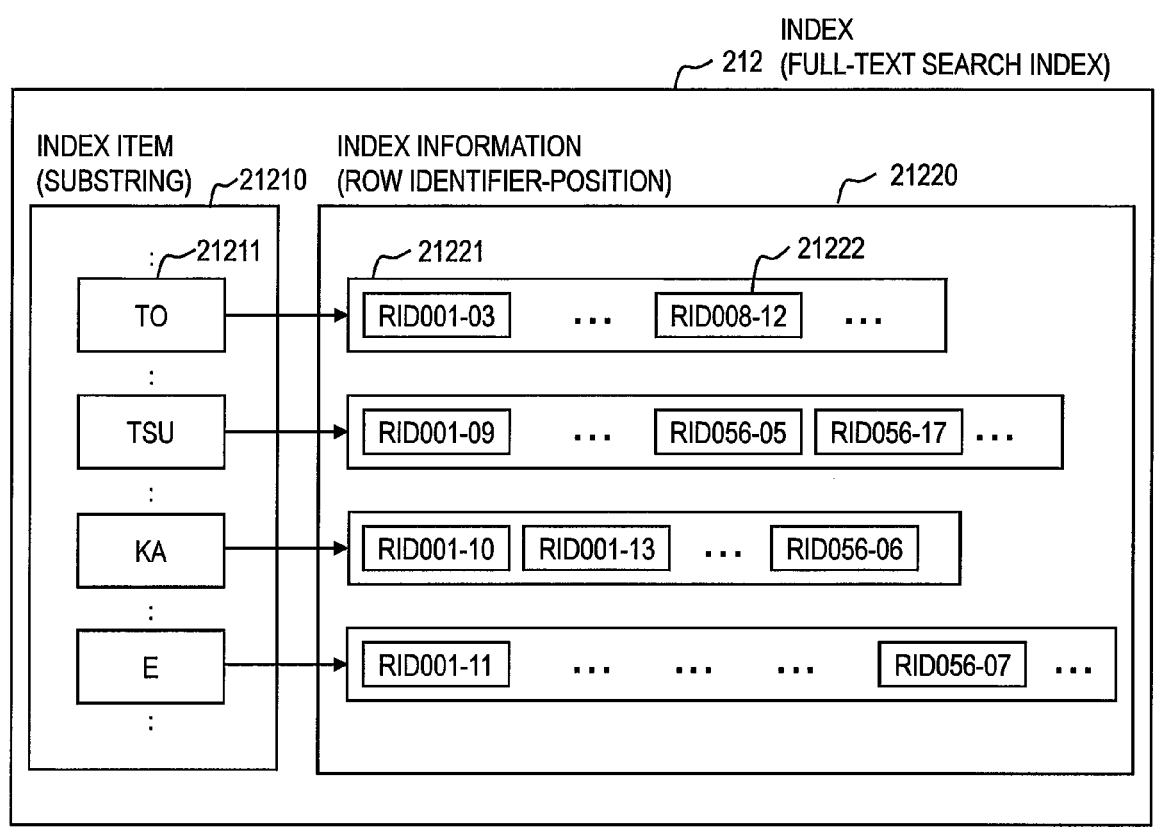
FIG. 8 is a diagram illustrating an example of a structure of the index which is a full-text search index for a keyword-specified search according to the embodiment of this invention.

FIG. 8 is a diagram illustrating an example of the structure of the index 212 which is a full-text search index for a keyword-specified search of this embodiment.

As illustrated in FIG. 8, the index 212 contains an index item 21210 and index information 21220 associated with the index item 21210.

The index item 21210 includes character strings 21211 contained in column data of a column that defines an index (which is not always an index key column). The character strings (substrings) 21211 in the example of FIG. 8 each have some characters of "TO", "TSU", "KA", or "E".

The index information 21220 includes a set 21221 of pairs (21222) of a row identifier and a position. A row identifier uniquely identifies a row that has as column data the character string 21211 constituting the index item 21210. In the example of FIG. 8, the row identifiers of rows that contain the character string 21211 "TO" are "RID001" and "RID008" among others, and the positions of the character string 21211 "TO" in the row data "RID001" and in the row data "RID008" are "03" and "12", respectively.

A row identifier specifically includes a page identifier for uniquely identifying which page 21100 is to store the data record 21130 described with reference to FIG. 7, and a slot number indicating a slot which identifies a data record storing position within a page. Slot numbers are assigned to slots sequentially starting from the one closest to the page control information 21110 in the page storing structure.

The row data access module 132 illustrated in FIG. 2 uses row identifiers to access the data records 21130. Specifically, the row data access module 132 uses a page identifier constituting a row identifier to access a page that stores the data record 21130 to be accessed, obtains a data record storing position recorded in a slot that is associated with a slot number constituting the row identifier to identify the head address of the data record 21130 to be accessed, and then accesses column data or the like in the data record 21130.

The index search module 142 receives a search result in which a keyword is specified, and refers to the specified keyword and the index item 21210 to identify the character string 21211 that contains the keyword. The index search module 142 obtains as a search result the row identifier-character string pair 21222 that is associated with the identified character string 21211.

The second storage unit 300 stores definition information indicating a logical database structure with respect to the table data 211 and the index 212, which are stored in the first storage unit 200 as the database 210. The second storage unit 300 is, similarly to the first storage unit 200, storage such as a flash memory or a magnetic disk.

Specifically, the second storage unit 300 stores the table definition information 310 as definition information of the table data 211 and the index definition information 320 as definition information of the index 212.

The first storage unit 200 and the second storage unit 300 are not necessarily separate storage units but may be one same storage unit.

FIG. 3 is a diagram illustrating an example of the table definition information (column information) 310 of this embodiment.

The table definition information 310 has a table format in which each column constituting a table makes one record. Column information contains a column name 312, which identifies the column information, a table name 311, which is the name of a table containing the identified column, a column data type 313, which is the type of data of the identified column, and an index key column label 314, which indicates whether or not the identified column is an index key column.

The table definition information 310 illustrated in FIG. 3 corresponds to an example of a table definition request described later with reference to FIG. 4. Specifics of the correspondence between the two will be described later with reference to FIG. 4.

FIG. 4 is a diagram illustrating an example of a table definition request (SQL) for creating table definition information of this embodiment.

The table definition request of FIG. 4 represents a table definition statement of the INSHOKU2 table, which contains an index key column, and uses a keyword "TEXTSEARCH INDEX KEY" to specify the ALL_KANA_NAME column as an index key column. A person who creates the database 210, for example, a programmer of the application program 400, can reduce the storage capacity of the table data 211 of the database 210 by specifying the keyword "TEXT-SEARCH INDEX KEY". The application program 400 can thus provide a fast keyword search service to an end-user through the database management apparatus 1.

The table definition information (column information) 310 illustrated in FIG. 3 corresponds to the table definition request example illustrated in FIG. 4 as mentioned above.

The column data type of a column that has a table name "INSHOKU2" and a column name "ALL_KANA_NAME" is "VARCHAR (variable length character string type) of 4,000 bytes at maximum length", and the index key column label 314 of this column is "T". This column is therefore an index key column.

A fifth record 315 counted from the top of the table definition information 310 of FIG. 3 is column information indicating the ALL_KANA_NAME column. "T" written as the index key column label 314 of this record means that the table definition request has specified this column as an index key column with the use of the keyword "TEXTSEARCH INDEX KEY".

On the other hand, the column data type of a column that has a table name "INSHOKU2" and a column name "SID" is "INT" (integer type), and the index key column label 314 of this column is "NULL". This column is therefore not an index key column. Similarly to the column having a column name "SID", columns having column names "TEL_NO", "SHOP_CODE" and "AREA_CODE" are not index key columns.

In this example, the column name "TEL_NO" is a telephone number having a data type "pack type of twelve characters in total including ten numerical values (expressed as pack (12, 10))". The column name "SHOP_CODE" is a shop code having a data type "INT". The column name "AREA_CODE" is an area code having a data type "INT". The pack type is a format in which 1-byte data containing numerical values and characters is expressed as two digits in the decadal system. For example, a telephone number "045-877-6637" is expressed by the pack type internal data format in six bytes (twelve characters) as 0x04, 0x5A, 0x87, 0x7A, 0x66, 0x37 (the character "-" is expressed as 0xA).

FIG. 5 is a diagram illustrating an example of the index definition information 320 of this embodiment.

The index definition information 320 takes a table format in which each defined index constitutes one record. An index is defined to a column constituting a table. The index definition information 320 contains an index name 321, a table name 322 of a table containing a column to which an index identified by the index name 321 is defined, a column name 323 of the column to which the index is defined, and an index type 324 of the index.

The index definition information 320 illustrated in FIG. 5 corresponds to an index definition request example described later with reference to FIG. 6. Specifics of the correspondence between the two will be described later with reference to FIG. 6.

FIG. 6 is a diagram illustrating an example of an index definition request (SQL) for creating an index of this embodiment.

The index definition request of FIG. 6 indicates an index definition statement that defines a full-text search index for providing a keyword search service to the index key column "ALL_KANA_NAME" of the INSHOKU2 table which is defined by the table definition request of FIG. 4. "ON "INSHOKU2"("ALL_KANA_NAME")" indicates that an index having an index name "IDX_ALLKANA" is defined to the ALL_KANA_NAME column of the INSHOKU2 table. A keyword "TEXTSEARCH" specified next indicates the index type. When the keyword "TEXTSEARCH" is specified, it means that a full-text search index for providing a keyword search service is used in implementing (the data structure and provided function of) the index 212. When the keyword "TEXTSEARCH" is not specified, a B-tree index is used in this embodiment.

The index definition information 320 illustrated in FIG. 5 corresponds to the index definition request example illustrated in FIG. 6. According to the index definition information 320 of FIG. 5, an index 326 having an index name "IDX_ALLKANA" is defined to a column having a table name "INSHOKU2" and a column name "ALL_KANA_NAME", and has "TEXTSEARCH" as the index type 324. This index 212 is therefore a full-text search index for providing a keyword search service.

An index 325 having an index name "IDX_SID" is defined to a column having a column name "SID" in a table having a table name "INSHOKU2". The index type of the index 325 is "B-TREE", and the index 325 is therefore a B-tree index for conducting a range search on data values, not a full-text search index.

A database management method of this embodiment which includes steps illustrated in a flow chart of FIG. 9 will be described next with reference to FIG. 2.

Figure 9:
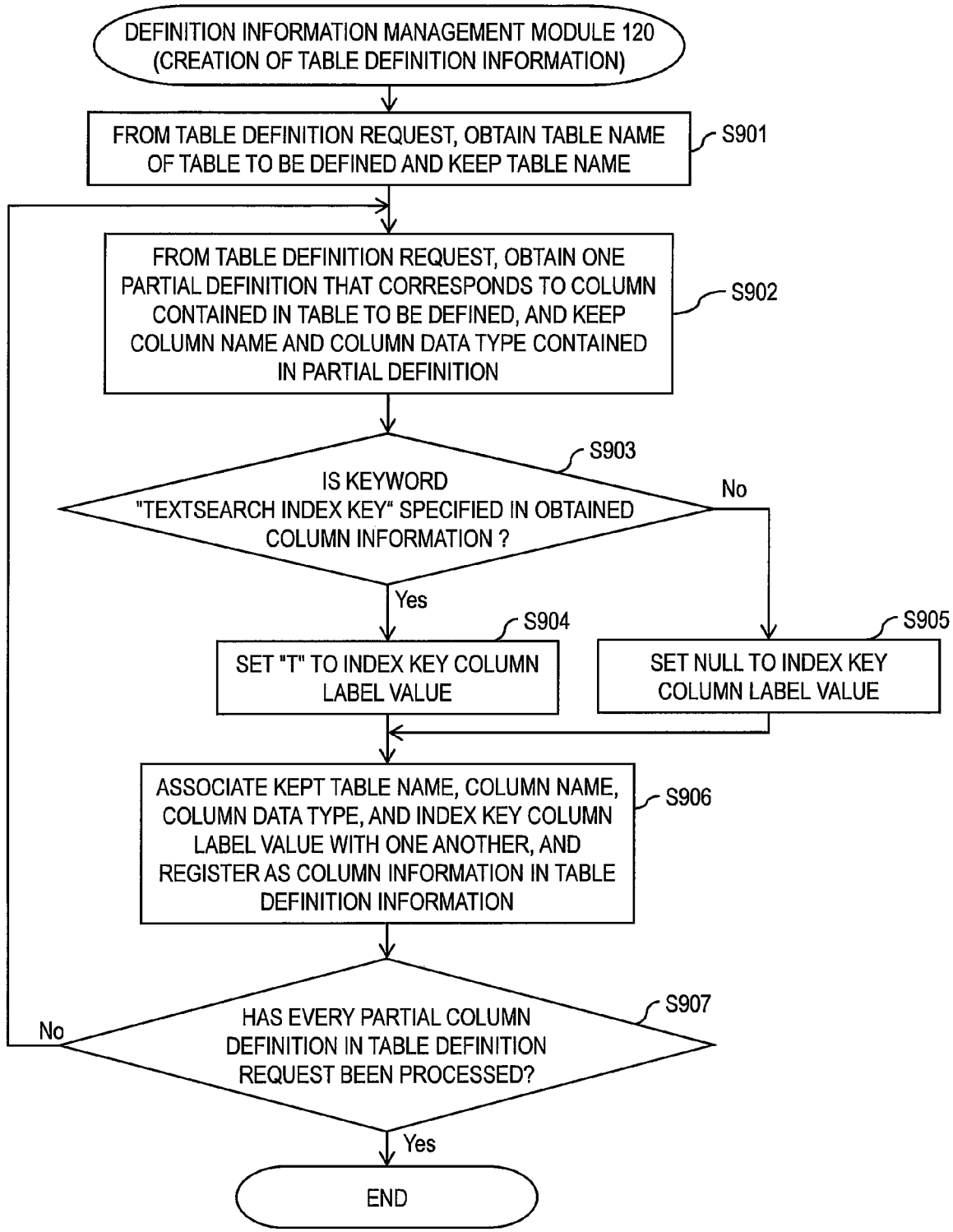
FIG. 9 is a flow chart illustrating processing steps that are executed by a database management system to define a table containing an index key column according to the embodiment of this invention.

FIG. 9 is a flow chart illustrating processing steps that are executed by the database management system 100 of this embodiment to define a table containing an index key column.

This processing is executed by the CPU 700 by running the definition information management module 120.

The CPU 700 first executes the definition information management module 120 to obtain the table name of a table to be defined from a table definition request input from the application program 400 or others, and keep the table name in the memory 800 (Step S901). For example, when the table definition request of FIG. 4 is input, "INSHOKU2" is the table name of the table to be defined, and is held in the memory 800.

The CPU 700 next obtains from the table definition request a partial definition that corresponds to a column contained in the table to be defined, and keeps a column name and a column data type that are contained in the partial definition in the memory 800 (Step S902). For example, in the case of the SID column, "SID" and "INT", which indicates integer type, are kept in the memory 800 as the column name and the column data type, respectively. In the case of the ALL_KANA_NAME column which is another column, "ALL_KANA_NAME" is kept as the column name and "VARCHAR (4000)", which indicates a variable length character string type of 4,000 bytes at maximum data length, is kept as the column data type.

The CPU 700 judges whether or not the keyword "TEXT-SEARCH INDEX KEY" is specified in the obtained column information (Step S903). In the case where the keyword "TEXTSEARCH INDEX KEY" is specified (when the answer to Step S903 is "Yes"), it means that this column is an index key column and "T" is kept in the memory 800 as the value of the index key column label 314 (Step S904). In the table definition information 310 of FIG. 3, the keyword "TEXTSEARCH INDEX KEY" is specified to the ALL_KANA_NAME column and accordingly, "T" is kept as the value of the index key column label 314.

On the other hand, in the case where the keyword "TEXTSEARCH INDEX KEY" is not specified in the obtained column information (when the answer to Step S903 is "No"), it means that this column is not an index key column and thus the CPU 700 keeps "NULL" in the memory 800 as the value of the index key column label 314 (Step S905). In the table definition information 310 of FIG. 3, the keyword "TEXTSEARCH INDEX KEY" is not specified to the SID column, the TEL_NO column, the SHOP_CODE column, and the AREA_CODE column and, accordingly, "NULL" is kept as the value of the index key column label 314.

The CPU 700 thereafter associates the table name, the column name, the column data type, and the index key column label value that are kept in the memory 800 with one another to create column information, and registers the column information in the table definition information 310 (Step S906).

The CPU 700 judges whether or not Steps S902 to S906 have been executed for every partial column definition that is contained in the table definition request (Step S907). When Steps S902 to S906 have not been finished for all of the partial column definitions (when the answer to Step S907 is "No"), the CPU 700 returns to Step S902 to continue the processing. When Steps S902 to S906 have been finished for all of the partial column definitions (when the answer to Step S907 is "Yes"), this processing is ended.

Figure 10:
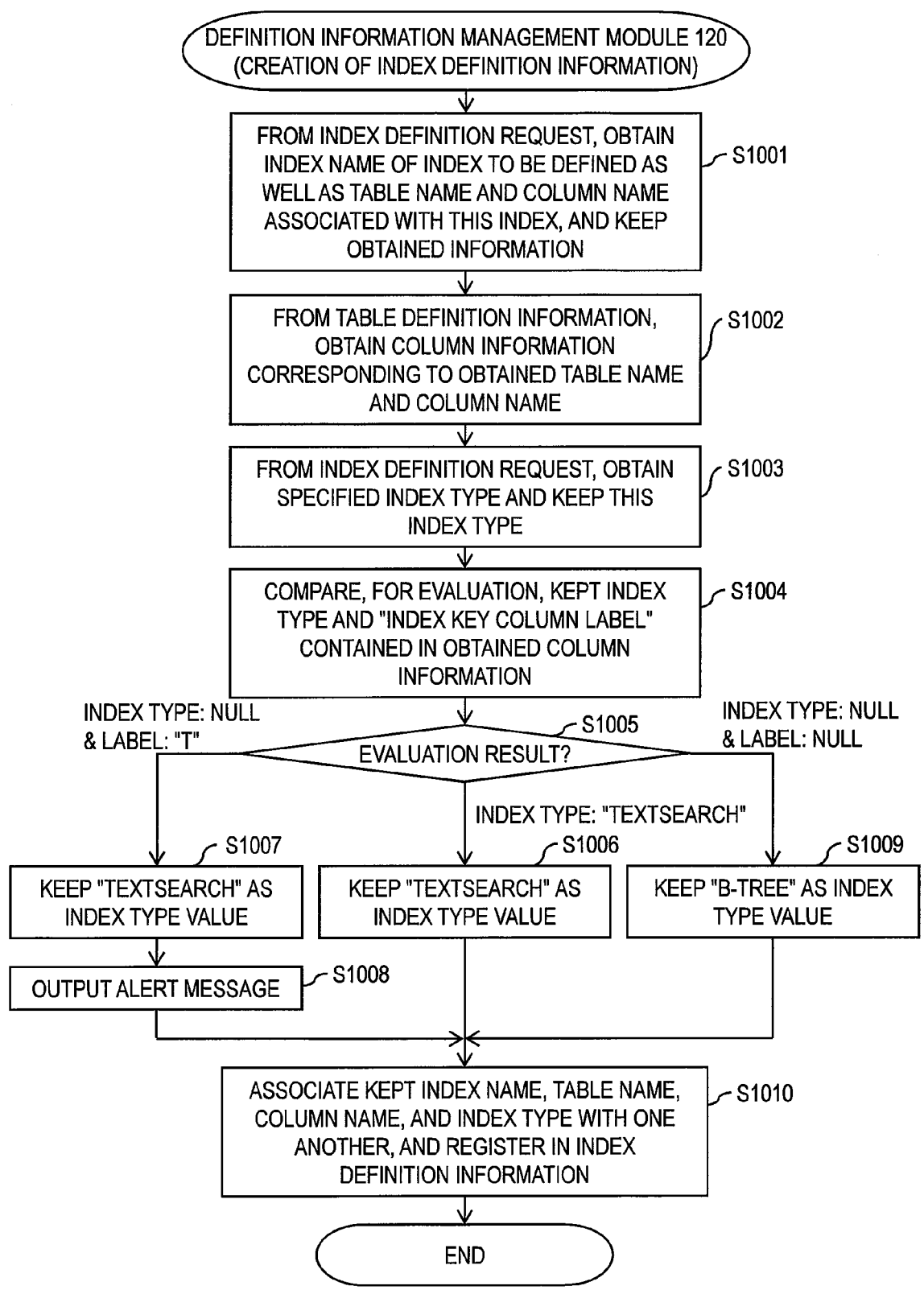
FIG. 10 is a flow chart illustrating processing steps that are executed by the database management system to define an index according to the embodiment of this invention.

FIG. 10 is a flow chart illustrating processing steps that are executed by the database management system 100 of this embodiment to define an index.

The CPU 700 first executes the definition information management module 120 to obtain the index name of an index to be defined as requested by an index definition request input from the application program 400 or others, as well as a table name and a column name that are associated with this index, and keeps the obtained index name, table name, and column name in the memory 800 (Step S1001). To take the example of the index definition request illustrated in FIG. 6, the index name of the index to be defined is "IDX_ALLKANA", and a table to which the index is to be defined has a table name "INSHOKU2" and a column name "ALL_KANA_NAME".

The CPU 700 next obtains from the table definition information 310 column information corresponding to the obtained table name and column name (Step S1002). In the index definition request of FIG. 6, the column information to be obtained corresponds to the record 315 of the table definition information (column information) 310 of FIG. 3 having the column name 312 "ALL_KANA_NAME".

Next, the CPU 700 obtains an index type specified by the index definition request and keeps the index type in the memory 800 (Step S1003). According to the index definition request of FIG. 6, an index type "TEXTSEARCH" is kept in the memory 800. In the case where no index type is specified by the index definition request, "NULL" is held in the memory 800.

The CPU 700 compares for evaluation the index type held in the memory 800 and an "index key column label" value contained in the obtained column information (Step S1004 and Step S1005).

When the index type kept in the memory 800 is "TEXTSEARCH" as the result of the evaluation (when the answer to Step S1005 is "index type is "TEXTSEARCH""), the CPU 700 keeps "TEXTSEARCH" as the value of the index type (Step S1006). In the case of the index definition request of FIG. 6, the kept index type is "TEXTSEARCH" and accordingly, Step S1006 is executed.

When the index type kept in the memory 800 is "NULL" and the index key column label value is "T" as the result of the evaluation (when the answer to Step S1005 is "index type is "NULL" and index key column label is "T""), the CPU 700 judges that "TEXTSEARCH" is specified by the index definition request and keeps "TEXTSEARCH" as the index type value (Step S1007). The CPU 700 outputs an alert message to inform of the inconsistency between the index type value and the index key column label value (Step S1008).

When the kept index type is "NULL" and the index key column label value is "NULL" as the result of the evaluation, the CPU 700 keeps "B-TREE" as the index type value (Step S1009). The index type "B-TREE" indicates that the index is a B-tree index which is a tree structure used in a range search of numerical values or a similar search.

The CPU 700 associates the index name, the table name, the column name, and the index type that are kept in the memory 800 with one another and registers the resultant information in the index definition information 320 (Step S1010). According to the index definition request of FIG. 6, a record having the index name 321 "IDX_ALLKANA", the table name 322 "INSHOKU2", the column name 323 "ALL_KANA_NAME", and the index type 324 "TEXTSEARCH" as in a record of the index definition information 320 of FIG. 5 is registered as index definition information.

In Step S1005 of this embodiment where the evaluation result is judged, when the kept index type is "NULL" and the index key column label is "T" as the result of the evaluation, it is judged that "TEXTSEARCH" is specified by the index definition request. Alternatively, the CPU 700 may judge that the index type is not specified correctly by the index definition request, and may send an error message to that effect.

Figure 11:
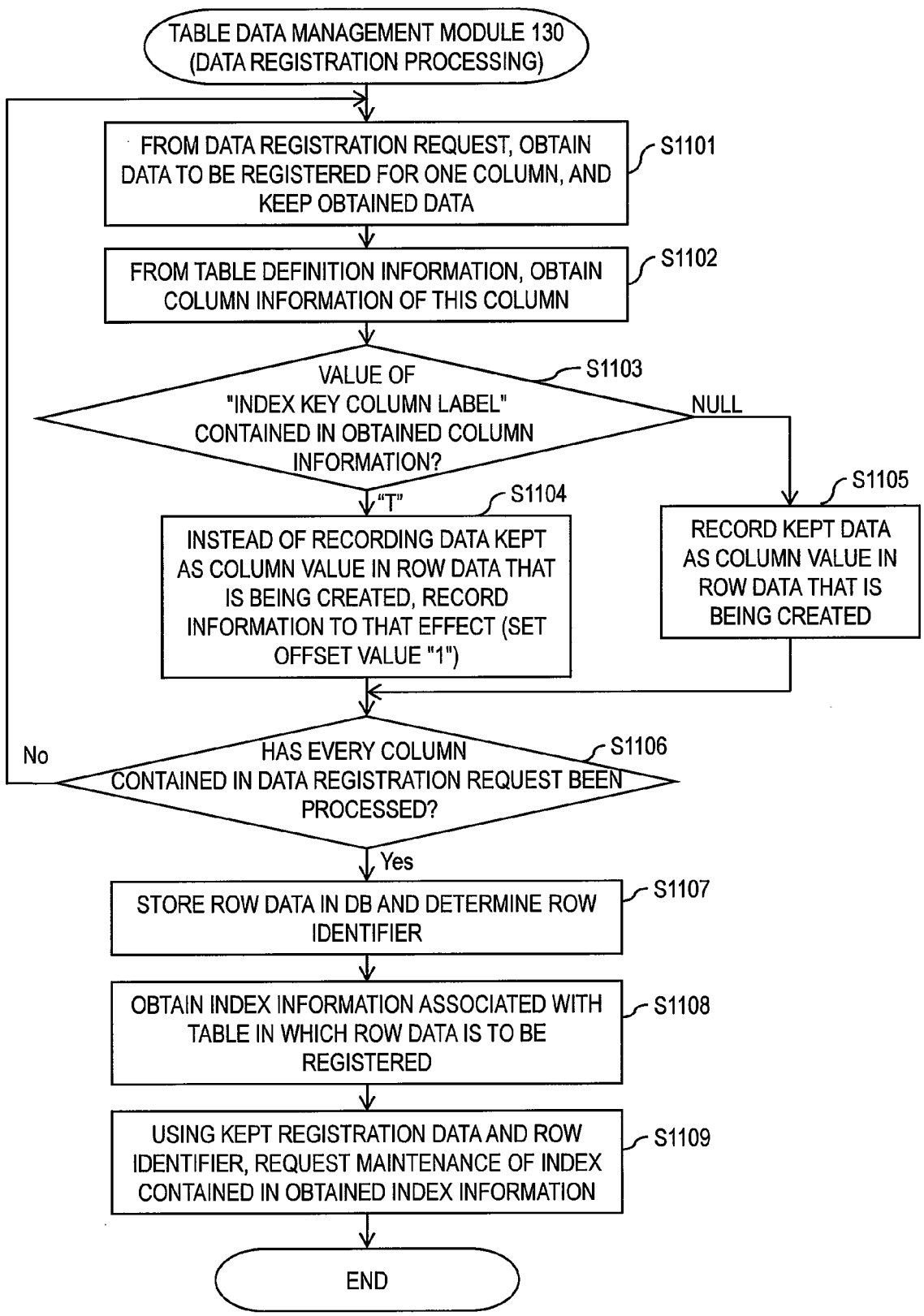
FIG. 11 is a flow chart illustrating processing steps that are executed by the database management system to register data in a table containing an index key column according to the embodiment of this invention.

FIG. 11 is a flow chart illustrating processing steps that are executed by the database management system 100 of this embodiment to register data in a table containing an index key column.

The CPU 700 first executes the table data management module 130 to obtain data to be registered for one column as requested by a data registration request, which is made by the data manipulation request module 410 of the application program 400, and keeps the obtained data in the memory 800 (Step S1101).

The CPU 700 next refers to the table definition information 310 to obtain column information of this column (Step S1102).

The CPU 700 judges an index key column label value contained in the obtained column information (Step S1103). When the index key column label value is "T" (true) (when the answer to Step S1103 is "T"), the CPU 700 executes the index key column processing module 133 to record information indicating that this column is an index key column, instead of recording data kept as column values in row data that is being created (Step S1104). Specifically, an offset value "1" is set to the data field 21134 which has been described with reference to FIG. 7.

When the index key column label value is "NULL" (when the answer to Step S1103 is "NULL"), the CPU 700 executes the row data creating module 131 to record data kept as column values in row data that is being created (Step S1105).

After the above-mentioned steps are ended, the CPU 700 judges whether or not every column contained in the data registration request has been processed (Step S1106). When not all of the columns have been processed (when the answer to Step S1106 is "No"), the CPU 700 returns to Step S1101 to continue the processing.

When every column has been processed (when the answer to Step S1106 is "Yes"), the CPU 700 stores the created row data in the database (DB), and determines a row identifier for the stored row data (Step S1107). Specifically, the row identifier for the stored row data is determined from the identifier of the page 21100 that contains the stored row data, namely, data record, and the slot number of the slot 21120 that indicates the position of the data record within the page, as described with reference to FIG. 7.

The CPU 700 next refers to the index definition information 320 to obtain index information that is associated with a table in which the row data is to be registered (Step S1108). The CPU 700 then requests the index management module 140 to perform maintenance on an index that is contained in the obtained index information, based on registration data and a row identifier that are kept in the memory 800 (Step S1109). Requested to perform index maintenance, the index management module 140 uses the index maintenance module 141 to update the index.

Figure 12:
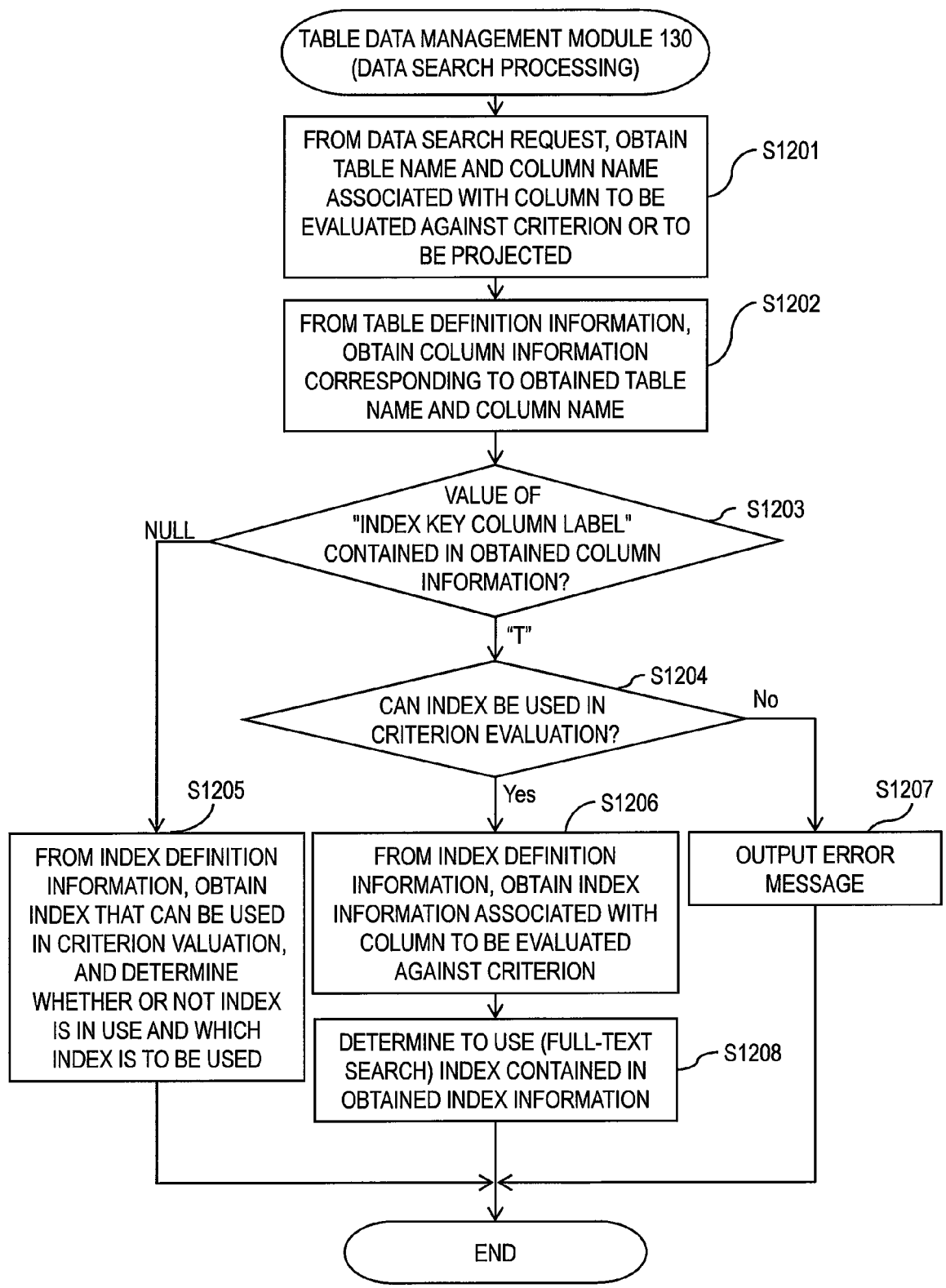
FIG. 12 is a flow chart illustrating processing steps that are executed by the database management system to execute a search request containing a search criterion for an index key column according to the embodiment of this invention.

FIG. 12 is a flow chart illustrating processing steps that are executed by the database management system 100 of this embodiment to execute a search request containing a search criterion for an index key column.

The CPU 700 first executes the table data management module 130 to obtain a table name and a column name that are associated with a column to be evaluated against a criterion or to be projected (taken out) as requested by a data search request made by the data manipulation request module 410 of the application program 400 (Step S1201).

The CPU 700 next refers to the table definition information 310 to obtain column information corresponding to the obtained table name and column name (Step S1202).

The CPU 700 judges an index key column label value contained in the obtained column information (Step S1203). When the index key column label value is "NULL" (when the answer to Step S1203 is "NULL"), the CPU 700 obtains indices that can be used for an evaluation against a criterion from the index definition information 320, and determines whether or not the indices are in use and which index is to be used (Step S1205). Thereafter, an index determined by the index search module 142 is used to obtain, as a search result, the row identifier for a row that meets the criterion. According to the search request, the row data access module 132 obtains requested column data and returns the column data to the application program 400 which has made the request.

When an index key column label value contained in the obtained column information is "T" (when the answer to Step S1203 is "T"), the CPU 700 judges whether or not an index can be used for an evaluation against a criterion (Step S1204). When the index can be used (when the answer to Step S1204 is "Yes"), the CPU 700 obtains from the index definition information 320 index information that is associated with the column to be evaluated against a criterion (Step S1206). Then the CPU 700 determines to use a (full-text search) index that is contained in the index information obtained in Step S1206 (Step S1208). The CPU 700 thereafter uses the index determined by the index search module 142 to obtain, as a search result, the row identifier for a row that meets the criterion as in Step S1205. According to the search request, the row data access module 132 obtains requested column data and returns the column data to the application program 400 which has made the request.

On the other hand, when an index cannot be used (the answer to Step S1204 is "No"), the CPU 700 outputs an error message informing that the search is not executable (Step S1207), and ends the search processing. An index cannot be used for a search when, for example, obtaining the value of an index key column for which no table data is stored is involved.

Figure 13:
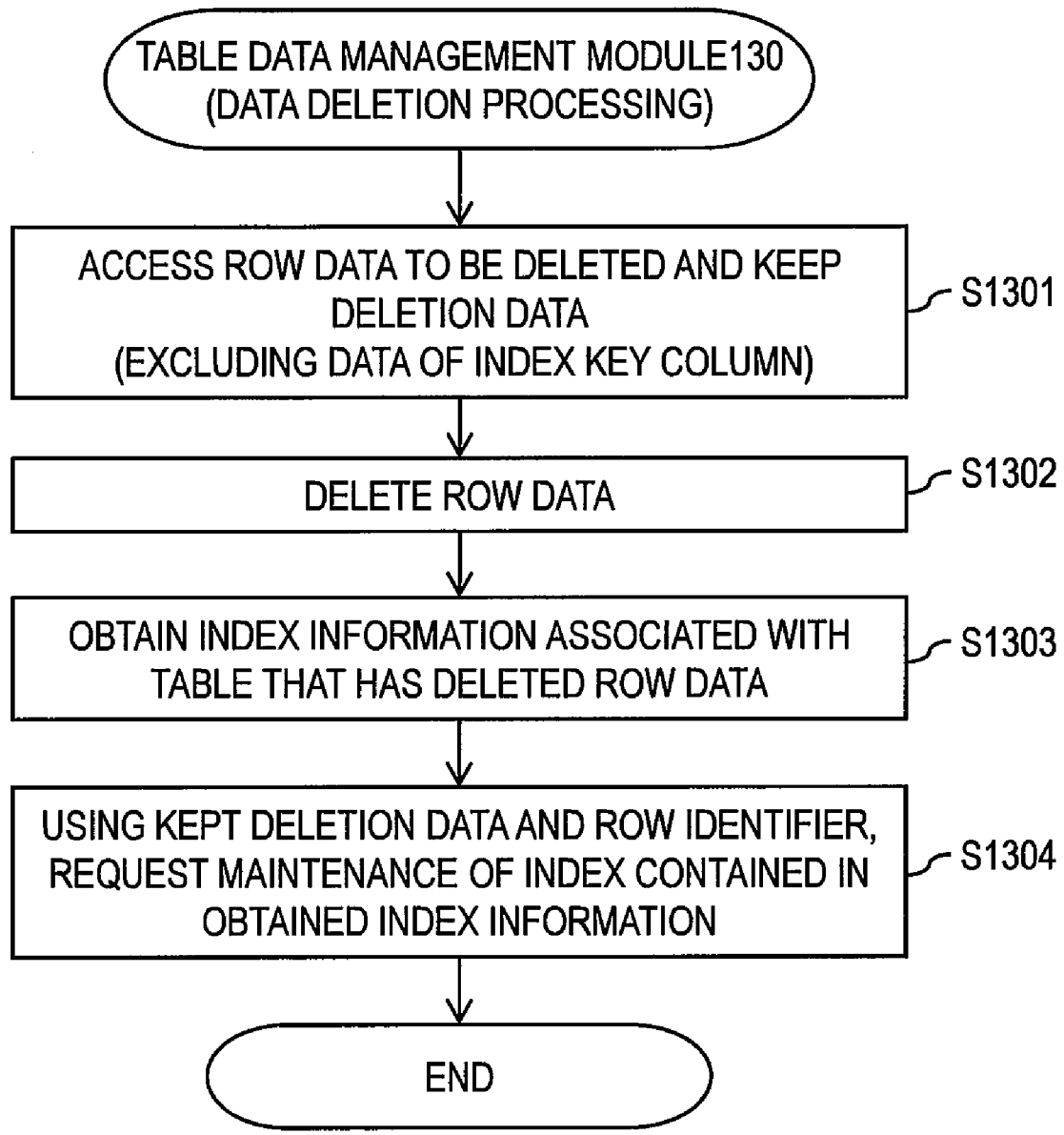
FIG. 13 is a flow chart illustrating processing steps that are executed by the database management system to delete data from a table containing an index key column according to the embodiment of this invention.

FIG. 13 is a flow chart illustrating processing steps that are executed by the database management system 100 of this embodiment to delete data from a table containing an index key column.

The CPU 700 first executes the table data management module 130 to access row data to be deleted as requested by a data deletion request, which is made by the data manipulation request module 410 of the application program 400, and keeps deletion data in the memory 800 (Step S1301). In the case where the row data to be deleted contains an index key column, the index key column processing module 133 makes sure that data corresponding to data of the index key column is not kept in the memory 800.

The CPU 700 then deletes the specified row data (Step S1302).

The CPU 700 next refers to the index definition information 320 to obtain index information relevant to a table from which the row data is deleted (Step S1303).

The CPU 700 requests the index management module 140 to perform maintenance on an index contained in the obtained index information, based on the deletion data and a row identifier that are kept in the memory 800 (Step S1304). As for deleted column data of the index key column, the CPU 700 requests the index management module 140 to perform maintenance based only on the row identifier for the data to be deleted. Requested to perform index maintenance, the index management module 140 uses the index maintenance module 141 to update the index. In the case of an index associated with an index key column, the index maintenance module 141 deletes a row identifier kept in the index from the index.

Figure 14:
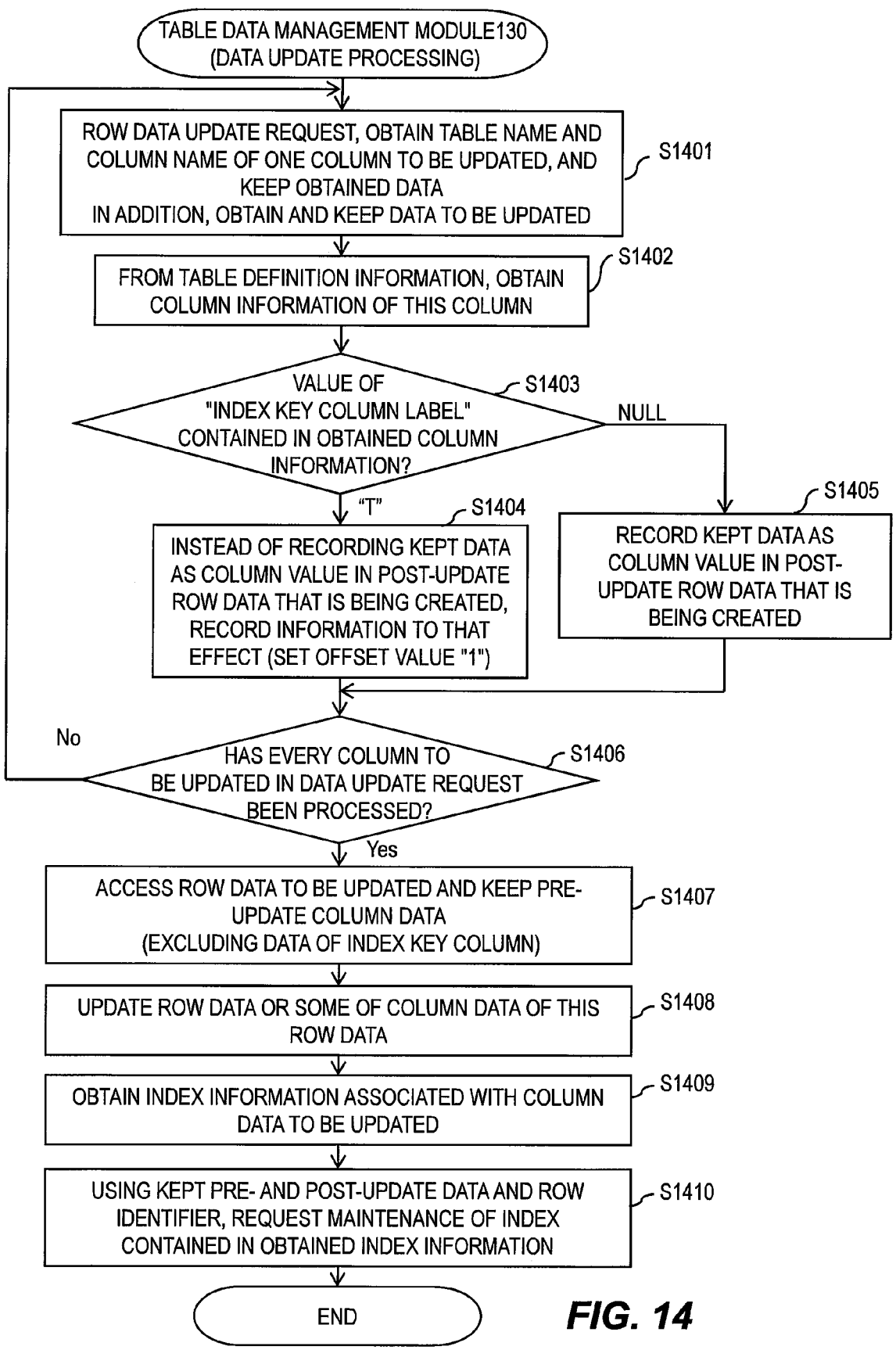
FIG. 14 is a flow chart illustrating processing steps that are executed by the database management system to update an index key column according to the embodiment of this invention.

FIG. 14 is a flow chart illustrating processing steps that are executed by the database management system 100 of this embodiment to update an index key column.

The CPU 700 first executes the table data management module 130 to obtain data to be updated (post-update data) for one column as requested by a data update request, which is made by the data manipulation request module 410 of the application program 400, and keeps the obtained data in the memory 800 (Step S1401).

The CPU 700 next refers to the table definition information 310 to obtain column information of this column (Step S1402).

The CPU 700 judges an index key column label value contained in the obtained column information (Step S1403). When the index key column label value is "T" (when the answer to Step S1403 is "T"), the CPU 700 executes the index key column processing module 133 to record information indicating that this column is an index key column, instead of recording data kept as column values in row data that is being created (Step S1404). Specifically, an offset value "1" is set to the data field 21134 which has been described with reference to FIG. 7.

When the index key column label value is "NULL" (when the answer to Step S1403 is "NULL"), the CPU 700 executes the row data creating module 131 to record data kept as column values in row data that is being created (Step S1405).

After the above-mentioned steps are ended, the CPU 700 judges whether or not every column contained in the data update request has been processed (Step S1406). When not all of the columns have been processed (when the answer to Step S1406 is "No"), the CPU 700 returns to Step S1401 to continue the processing.

When every column has been processed (when the answer to Step S1406 is "Yes"), the CPU 700 accesses row data to be updated and keeps the row data prior to the update in the memory 800 (Step S1407). The index key column processing module 133 makes sure that data corresponding to data of the index key column is not kept in the memory 800.

The CPU 700 updates the row data, or some of the column data of this row data (Step S1408).

The CPU 700 next refers to the index definition information 320 to obtain index information associated with a table and a column that are relevant to the updated row data (Step S1409). The CPU 700 requests the index management module 140 to perform maintenance on an index contained in the obtained index information, based on the kept pre-update data and post-update data and row identifier (Step S1410). Requested to perform index maintenance, the index management module 140 uses the index maintenance module 141 to update the index.

According to this embodiment, column data of a column designated as an index key column is not stored as table data, and the capacity necessary to store a table is reduced that much. Data stored as table data is also stored in an index, and hence, as in this embodiment, data can be manipulated (inserted, updated, or deleted) without storing the data in a column.

In addition, this embodiment enables an embedded device to conduct a fast keyword search by associating an index that is used in full-text search with an index key column.

While the present invention has been described in detail and pictorially in the accompanying drawings, the present invention is not limited to such detail but covers various obvious modifications and equivalent arrangements, which fall within the purview of the appended claims.

What is claimed is:

1. A database management method for a database management apparatus which includes a processor and a memory holding a database composed of rows and columns and an index corresponding to at least one of the columns, and which manages data stored in the database by referring to the database and the index,
    the columns of the database including an index key column which does not including an area for storing data,
    wherein the database management method comprising the steps of:
    storing index definition information including the index key column and a full-text search index corresponding to each other;
    registering, upon reception of a request to register data in the table which includes the index key column, the data in an index key column which is specified by referring the index definition information, and the data in columns other than the index key column; and
    searching, upon reception of a request to search data in the table which includes the index key column, data by using a full-text search index which is specified as corresponding to the index key column by referring the index definition information, and data in columns other than the index key column.

2. A non-transient computer readable medium having instructions for executing a database management method for a database management apparatus which includes a processor and a memory holding a database composed of rows and columns and an index corresponding to at least one of the columns, and which manages data stored in the database by referring to the database and the index, the columns of the database including an index key column which does not include an area for storing data,
    wherein the database management method comprising the steps of:
    storing index definition information including the index key column and a full-text search index corresponding to each other;
    registering, upon reception of a request to register data in the table which includes the index key column, the data in an index key column which is specified by referring the index definition information, and the data in columns other than the index key column; and
    searching, upon reception of a request to search data in the table which includes the index key column, data by using a full-text search index which is specified as corresponding to the index key column by referring the index definition information, and data in columns other than the index key column.

3. A database management apparatus comprising:
    a processor; and
    a memory holding a database composed of rows and columns and an index corresponding to at least one of the columns, and which manages data stored in the database by referring the database and the index, the columns of the database including an index key column which does not include an area for storing data,
    wherein the processor executes a database management method comprising the steps of:
    storing index definition information including the index key column and a full-text search index corresponding to each other;
    registering, upon reception of a request to register data in the table which includes the index key column, the data in an index key column which is specified by referring the index definition information, and the data in columns other than the index key column; and
    searching, upon reception of a request to search data in the table which includes the index key column, data by using a full-text search index which is specified as corresponding to the index key column by referring the index definition information, and data in columns other than the index key column.

* * * * *